United States Patent [19]

Chiba

[11] Patent Number: 4,976,524
[45] Date of Patent: Dec. 11, 1990

[54] OPTICAL SYSTEM FOR ENDOSCOPES TO BE USED FOR OBSERVING THE INTERIOR OF PIPES

[75] Inventor: Masahiro Chiba, Hachiouji, Japan
[73] Assignee: Olympus Optical Co., Ltd., Tokyo, Japan
[21] Appl. No.: 344,606
[22] Filed: Apr. 28, 1989
[30] Foreign Application Priority Data
 Apr. 28, 1988 [JP] Japan .................. 63-106906
[51] Int. Cl.$^5$ .................. G02B 13/18; G02B 17/00
[52] U.S. Cl. .................. 350/432; 350/443
[58] Field of Search .................. 350/96.26, 442–444, 350/432–435

[56] References Cited

U.S. PATENT DOCUMENTS 4,415,240 11/1983 Nishioka et al. .................. 350/442
 4,610,513 9/1986 Nishioka et al. .................. 350/442 X
 4,628,207 12/1986 Elfert et al. .................. 350/96.26

FOREIGN PATENT DOCUMENTS 7834180 2/1979 Fed. Rep. of Germany .
 60-42728 3/1985 Japan .
 62-113317 7/1987 Japan .

Primary Examiner—Scott J. Sugarman
Attorney, Agent, or Firm—Cushman, Darby & Cushman

[57] ABSTRACT

An optical system for endoscopes to be used for observing the interior of pipes is provided with an imaging optical system including at least one convex or concave aspherical surface and a reflecting mirror arranged on the front side of the imaging optical system and having a reflecting surface shaped like a spherical or aspherical surface. The optical system for endoscopes can form a bright image which has little aberration and can also render the distal end portion of the endoscope finer.

8 Claims, 10 Drawing Sheets

ASTIGMATISM

ASTIGMATISM

ASTIGMATISM

ASTIGMATISM

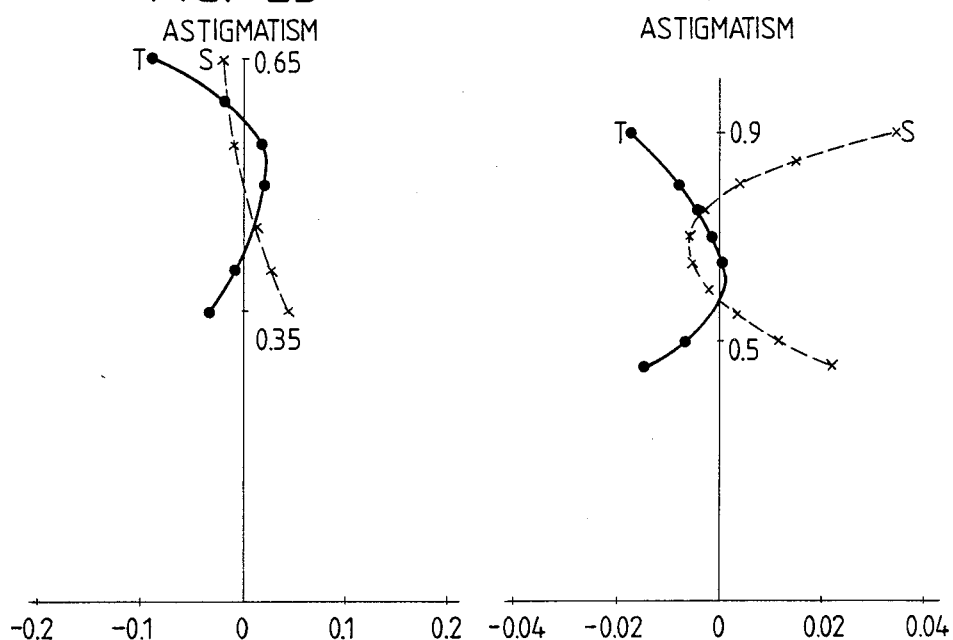

OPTICAL SYSTEM FOR ENDOSCOPES TO BE USED FOR OBSERVING THE INTERIOR OF PIPES

BACKGROUND OF THE INVENTION

1. Field of the Invention

The present invention relates to an optical system for endoscopes to be used for observing the interior of pipes, having an imaging optical system and a reflecting mirror arranged in front of (i.e., on the object side of) the imaging optical system, chiefly used to view an inner wall of a pipe laid under the ground and the like.

2. Description of the Prior Art

A conventional optical system for endoscopes of the type, as shown in FIG. 1 by way of example, has fundamentally comprised an image guide fiber bundle 2 arranged in an endoscope body 1, an imaging lens unit 3 arranged in front of the image guide 2, a conical mirror 4 disposed in front of the imaging lens unit 3 in such a way that its optical axis coincides with that of the imaging lens unit 3, and an aperture stop 5 provided between the imaging lens unit 3 and the conical mirror 4 so that light coming from an inner pipe wall S, after being reflected from the conical mirror 4, traverses the imaging lens unit 3, thereby being formed on an entrance end face of the image guide 2 as an image of the inner pipe wall S (German Utility Model No. 7834180). In this conventional instance, however, the problems have been encountered that intensive negative distortion of the imaging lens unit 3 diminishes magnification in a direction parallel with the axis of the pipe in the periphery of a visual field and consequently makes it difficult to observe delicate appearance of the inner pipe wall S.

Thus, to settle the preceding problems, there have been proposed an optical system including the conical mirror 4 configured so that its generatrix assumes a concave curve as depicted in, for example, FIG. 2 (Japanese Patent Preliminary Publication No. Sho 60-42728) and an optical system including the conical mirror 4 configured so that, as shown in FIG. 3, a curved surface 7 is attained by rotating an arc segment drawn, with a center G at a position shifted from an optical axis 6 in a plane including the optical axis 6, about the optical axis, on the opposite side of the center G in relation to the optical axis 6 (Japanese Utility Model Preliminary Publication No. Sho 62-113317).

However, the above two conventional instances have each caused the problems that curvature of the reflecting surface of the conical mirror 4 in a direction of a spherical segment (i.e., a direction of the circumference of a section cut by a plane normal to the optical axis) is largely different from that in a meridional direction (i.e., a direction of the generatrix), with the result that imaging positions in the direction of the spherical segment and the meridional direction are considerably shifted from each other, that is, an optical system which is large in astigmatic difference is brought about. For this reason, it has been required that the diameter of the aperture stop 5 is reduced or the size of the conical mirror 4 is increased to thereby diminish the difference in curvature between the direction of the spherical segment and the meridional direction. As a result, there have been further problems that a dark optical system with large F-number (F No.) is caused or the possibilities of the miniaturization and the reduction to a fine diameter of the distal end portion of the endoscope are made difficult.

SUMMARY OF THE INVENTION

In view of the above problems, it is the object of the present invention to provide an optical system for endoscopes to be used for observing the interior of pipes in which the distortion is favorably corrected, a bright optical system with small F No. is brought about, and the distal end portion of the endoscope can be miniaturized and reduced to a fine diameter.

This object is achieved, according to the present invention, by configuring at least one surface of lens components constituting an imaging optical system and at least one reflecting surface of a reflecting mirror as aspherical surfaces.

According to a preferred formation of the present invention, the reflecting surface of the reflecting mirror assumes such an aspherical surface as to be attained by drawing a curve compounded of curves of n order (n=2, 3, 4, 5,...), on the basis of a straight line inclined with respect to an optical axis in a plane surface including the optical axis, to revolve the curve round the optical axis and the aspherical surface is provided with at least one inflection point. The aspherical surface can be expressed by the following aspherical equation.

$$x = \frac{Cy^2}{1 + \sqrt{1 - PC^2y^2}} + \sum_{i=1}^{n} a_i y^{i+1} \tag{1}$$

where x and y are the values of coordinate, as shown in FIG. 4, taking the optical axis 6 as the x axis of abscissa so that the direction of an image is assumed to be positive and taking the y axis of ordinate in a direction normal to the x axis, respectively, with an origin of coordinate, at the intersection of an aspherical surface 7' with the optical axis 6, C is the curvature of a circle contacting with the aspherical surface 7' in the vicinity of the optical axis, P the conic constant of the aspherical surface 7', and at the aspherical coefficient of (i+1) order. In the case where each value of $a_1$, $a_2$, ... and $a_n$ is zero at P=1 and C=∞, equation (1) is given by $$x = \frac{y}{\sqrt{-P}}$$

which represents a conical surface. The aspherical surface 7' depicted in FIG. 4 increases gradually the radius of curvature of a convex curved surface in separating from the x axis (i.e., the optical axis) to suppress negative distortion and, in contrast to this, decreases the radius of curvature of the convex curved surface in the vicinity of the x axis to produce the negative distortion, thereby virtually equalizing the amount of distortion of an image on the periphery of an imaging surface with that at the center thereof as depicted in FIG. 6 (a view showing an imaging state in the case where a square lattice chart is arranged on the inner pipe wall S). It follows from this that, since the term of the high order of equation (1) is required to be made large, the sign of the curvature reverses in the midst of a transformation from the center to the periphery of the aspherical surface 7', which has the inflection point. Further, since, by doing so, the difference in curvature between the direction of the spherical segment and the meridional direction of the aspherical surface 7' is reduced, the shift of the imaging positions in two directions, that is, an astigmatic difference can be diminished. Thus, let us try to determine the configuration of the aspherical surface having such properties as in the foregoing. To begin with, $C = \infty$ is assumed, for simplification, in equation (1). This indicates that the radius of curvature of a circle coming in contact with the aspherical surface on the optical axis is zero, and such an aspherical surface projects in shape on the optical axis. As mentioned above, the aspherical surface has the inflection point at a certain position, so that quadratic differential equation f (y) of equation (1) is given by $$f(y) = \frac{d^2x}{dy^2} + 2a_i + Ga_212\ a_3y^2 + 20a_4y^3 + 30a_5y^4 + \ldots \quad (2)$$

and the value of y to be $$f(y) = 0$$

at $y \neq 0$ exists. If this value is taken as $y_0$, the following conditions are established in relation to equation f(y).

$$\begin{aligned} 0 < y < y_0 & \quad \ldots \quad f(y) < 0 \\ y = y_0 & \quad \ldots \quad f(y) = 0 \\ y_0 < y & \quad \ldots \quad f(y) > 0 \end{aligned} \quad (4)$$

That is to say, an arrangement is made so that the aspherical coefficient satisfying these conditions is arbitrarily set. However, it is evident that, although the vicinity of the optical axis and the outermost periphery of the aspherical surface sometimes are not used for the reflection of light incident on the imaging optical system, there is no problem even if they are out of the conditions. By satisfying the above conditions, the diameter of the aperture stop can be increased in particular, that is, a bright image can be secured. Accordingly, an optical system with small F No. is accomplished and the distal end portion of the endoscope can be miniaturized and reduced to a fine diameter.

According to another preferred formation of the present invention, the imaging optical system includes at least one positive lens surface having a portion where the radius of curvature on the periphery is larger than that at the center or at least one negative lens surface having a portion where the radius of curvature on the periphery is smaller than that at the center.

According to still another preferred formation of the present invention, the reflecting surface of the reflecting mirror assumes any of a spherical surface, conical surface, or aspherical surface except for the conical surface and the imaging optical system includes at least one aspherical surface.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 23 to 27 are diagrams showing astigmatism of the fifth to ninth embodiments depicted in FIGS. 12 to 16, respectively.

DESCRIPTION OF THE PREFERRED EMBODIMENTS

Figure 1:
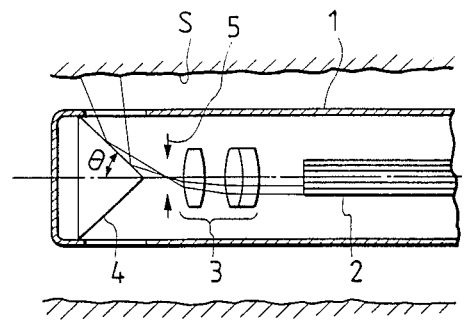
FIGS. 1 and 2 are sectional views showing structual examples of conventional optical systems for endoscopes to be used for observing the interior of pipes which are different from each other.
Figure 2:
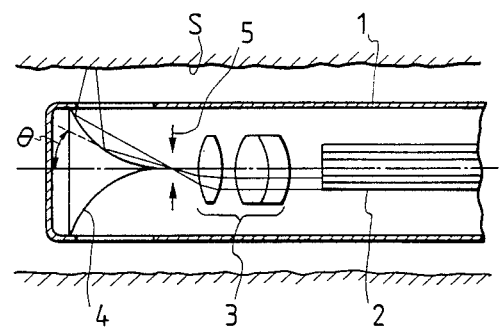
Figure 3:
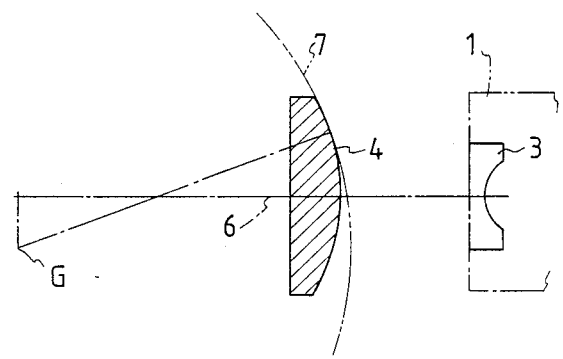
FIG. 3 is a view for explaining the configuration of the reflecting surface of a reflecting mirror incorporated in the conventional optical systems for endoscopes to be used for observing the interior of pipes.
Figure 4:
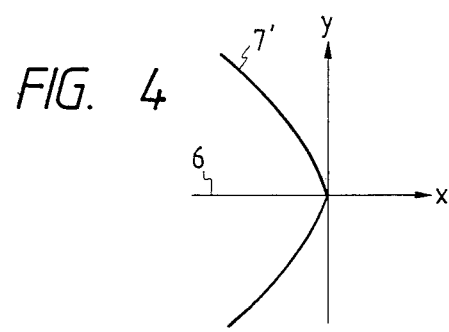
FIG. 4 is a sectional view of an aspherical surface used as a reflecting surface of those included in an optical system for endoscopes according to the present invention.

Based on individual embodiments shown in the drawings, the present invention will be described in detail below, with like reference numerals and symbols used to designate like members employed in the embodiments.

Figure 5:
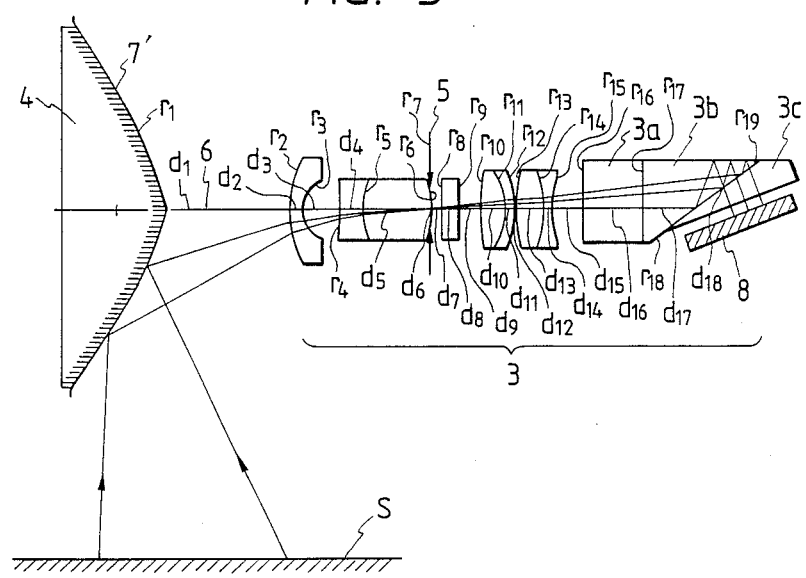
FIG. 5 is a view showing a first embodiment of the optical system for endoscopes according to the present invention.
Figure 6:
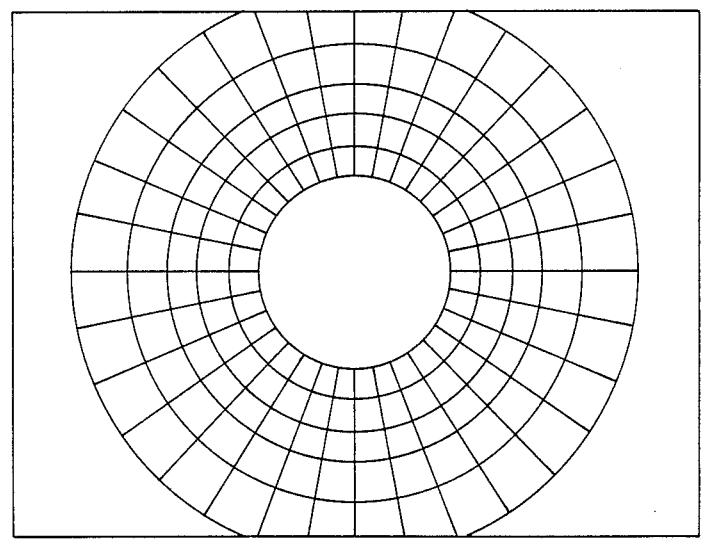
FIG. 6 is a view showing an imaging state brought about by the first embodiment of the present invention in the case where a square lattice chart is arranged on an inner pipe wall.

FIG. 5 shows a first embodiment, in which reference numeral 3 represents an imaging optical system, 3a an optical filter, and 3b and 3c prisms for reflecting twice to arrange obliquely a solid-state image sensor 8 in regard to a longitudinal direction of the endoscope, with the intention of making fine the diameter of the distal end portion of the endoscope. Reference numeral 4 represents a reflecting mirror having an aspherical reflecting surface 7' whose center axis is aligned with an optical axis of the imaging optical system 3. Reference numeral 8 denotes the solid-state image sensor. According to this embodiment, a picture image having little distortion is brought about as illustrated in FIG. 6. Also, as stated already, the aspherical surface 7' is configured to have the inflection point on the periphery.

Numerical data of the first embodiment are listed below.

| f = 3.812, F/5 | | | |
|---|---|---|---|
| $r_1 = 0$ (A) (reflecting surface) | | | |
| | $d_1 = 4.1$ | | |
| $r_2 = 7.0010$ | | | |
| | $d_2 = 0.7$ | $n_1 = 1.883$ | $v_1 = 40.78$ |
| $r_3 = 2.1660$ | | | |
| | $d_3 = 3.36$ | | |
| $r_4 = -14.8050$ | | | |
| | $d_4 = 3.0$ | $n_2 = 1.697$ | $v_2 = 48.51$ |

-continued

| | | | |
|---|---|---|---|
| $r_5 = 5.4050$ | | | |
| | $d_5 = 3.0$ | $n_3 = 1.6727$ | $\nu_3 = 32.10$ |
| $r_6 = -5.4050$ | | | |
| | $d_6 = 0$ | | |
| $r_7 = \infty$ (stop) | | | |
| | $d_7 = 0.93$ | | |
| $r_8 = \infty$ | | | |
| | $d_8 = 0.5$ | $n_4 = 1.51633$ | $\nu_4 = 64.15$ |
| $r_9 = \infty$ | | | |
| | $d_9 = 1.2$ | | |
| $r_{10} = 15.3440$ | | | |
| | $d_{10} = 1.4$ | $n_5 = 1.53256$ | $\nu_5 = 45.91$ |
| $r_{11} = -3.5900$ | | | |
| | $d_{11} = 0.5$ | $n_6 = 1.84666$ | $\nu_6 = 23.78$ |
| $r_{12} = -6.0180$ | | | |
| | $d_{12} = 0.1$ | | |
| $r_{13} = 7.0540$ | | | |
| | $d_{13} = 1.58$ | $n_7 = 1.72916$ | $\nu_7 = 54.68$ |
| $r_{14} = -7.0540$ | | | |
| | $d_{14} = 0.5$ | $n_8 = 1.72825$ | $\nu_8 = 28.46$ |
| $r_{15} = 4.8630$ | | | |
| | $d_{15} = 1.48$ | | |
| $r_{16} = \infty$ | | | |
| | $d_{16} = 2.57$ | $n_9 = 1.54869$ | $\nu_9 = 45.55$ |
| $r_{17} = \infty$ | | | |
| | $d_{17} = 1.5$ | $n_{10} = 1.51633$ | $\nu_{10} = 64.15$ |
| $r_{18} = \infty$ | | | |
| | $d_{18} = 7.718$ | $n_{11} = 1.69500$ | $\nu_{11} = 42.16$ |
| $r_{19} = \infty$ | | | |

| First surface |
|---|
| $C = -\infty, P = -5.2935$ |
| $a_1 = 0, a_3 = -0.71924 \times 10^{-3},$ |
| $a_5 = 0.14507 \times 10^{-4}$ |
| $a_7 = -0.12229 \times 10^{-6}$ |
| $a_9 = 0.38661 \times 10^{-9}$ |
| $0 < y < 6.26 \ldots f(y) < 0$ |
| $y = 6.26 \ldots f(y) = 0$ |
| $6.26 < y \ldots f(y) > 0$ |

In these numerical data and other data which will be described later, (A) represents the aspherical surface. Further, f is the focal length of the lens system (the imaging optical system 3) except for the reflecting surface 7'; F the F-number of the lens system; $r_1, r_2, \ldots$ the radii of curvature of the reflecting surface 7' and individual lens surfaces; $d_1, d_2, \ldots$ the thicknesses of individual lens elements and the airspace between individual optical elemenets; $n_1, n_2, \ldots$ the refractive indices of individual lens elements; and $\nu_1, \nu_2, \ldots$ the Abbe numbers of individual lens elements.

Also, in this embodiment, if the imaging optical system 3 is arranged so that it can be divided into two groups by the aperture stop 5 to provide only a lens group located at the rear of the aperture stop in the endoscope body and to be capable of removing the other lens group and/or the reflecting mirror 4 placed in front thereof, it can be used as a direct-vision endoscope and an endoscope for observing the interior of pipes, as necessary, and an angle of view and the focal length or the direction of a visual field can also be varied by providing another optical system in front of the aperture stop 5, with the result that its application is remarkably broadened and such an endoscope is convenient for use.

Figure 7:
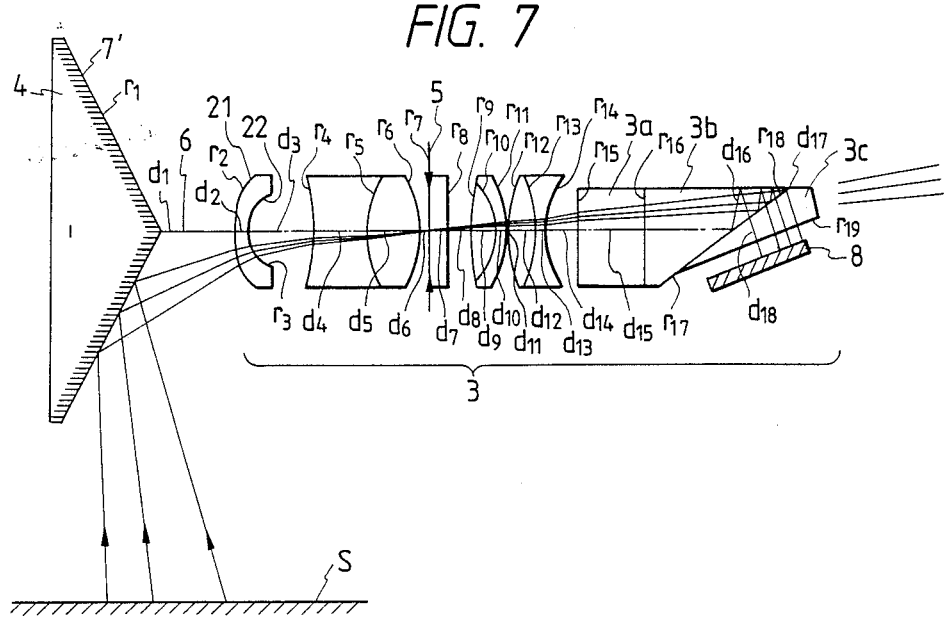
FIGS. 7 to 9 are views showing second to fourth embodiments of the optical system for endoscopes according to the present invention, respectively.

FIG. 7 depicts a second embodiment, in which the reflecting surface 7', like the first embodiment, is the aspherical surface having the inflection point on the periphery, and an aspherical surface 21 and an aspherical surface 22 whose radii of curvature reduce progressively in going from the center to the periphery are disposed in the imaging optical system 3, thereby diminishing an astigmatic difference (the amount of deviation between a meridional image surface and a spherical segmental image surface) and other optical aberrations.

Here, descriptions will be given of the configuration of the aspherical surface needed for the reduction of the astigmatic difference. As stated with regard to the first embodiment shown in FIG. 5, in view of the section in the meridional direction, the reflecting surface 7' assumes the configuration with the so-called inflection points at which a convex surface is configured in the vicinity of the optical axis and a concave surface is formed on the periphery. It follows from this that the reflecting surface 7' has a divergent behavior, in the meridional direction, from the optical axis to the vicinity of the inflection point and a convergent behavior, ranging from there to the periphery. In the spherical segmental direction, the divergent behavior increases progressively from the periphery toward the center point.

Then, due to such an unbalance between the convergent behavior and the divergent behavior, considerable astigmatism will be produced. In order to correct this defect, it is necessary for the imaging optical system 3 to cancel the aberration produced on the reflecting surface 7' in such a manner as to have the divergent behavior on the periphery in the meridional direction and as to intensify the convergent behavior from the periphery toward the optical axis in the spherical segmental direction. That is to say, a negative lens surface in the imaging optical system assumes such an aspherical surface that the radius of curvature can be decreased in going from the vicinity of the optical axis to the periphery to thereby have the divergent behavior stronger in the periphery than in the vicinity of the optical axis, in the meridional direction, and to have the convergent behavior stronger in the periphery than in the vicinity of the optical axis, in the spherical segmental direction, with the result that the above has an effect on the correction for cancelling the aberration produced on the reflecting surface 7'. Further, in the case of a positive lens surface, the effect equivalent to the case of the negative lens surface can be secured by increasing the radius of curvature in going to the periphery. However, since the above process is effective only in the correction of the astigmatic difference, it is only necessary to apply an aspherical surface different from the above surface onto another lens surface in order to reduce other optical aberrations. The aspherical surface 21 in the second embodiment is used for such purposes.

Numerical data of the second embodiment are shown in the following.

| $f = 4.052, \quad F/5$ | | | |
|---|---|---|---|
| $r_1 = -0.0001$ (A) (reflecting surface) | | | |
| | $d_1 = 7.585$ | | |
| $r_2 = 11.2566$ (A) | | | |
| | $d_2 = 0.7$ | $n_1 = 1.883$ | $\nu_1 = 40.78$ |
| $r_3 = 3.1139$ (A) | | | |
| | $d_3 = 3.6659$ | | |
| $r_4 = -10.8451$ | | | |
| | $d_4 = 3.0$ | $n_2 = 1.697$ | $\nu_2 = 48.51$ |
| $r_5 = 5.4050$ | | | |
| | $d_5 = 3.0$ | $n_3 = 1.6727$ | $\nu_3 = 32.10$ |
| $r_6 = -5.405$ | | | |
| | $d_6 = 0.5$ | | |
| $r_7 = \infty$ (stop) | | | |
| | $d_7 = 1.0$ | $n_4 = 1.51633$ | $\nu_4 = 64.15$ |
| $r_8 = \infty$ | | | |
| | $d_8 = 1.3$ | | |
| $r_9 = 15.3440$ | | | |
| | $d_9 = 1.4$ | $n_5 = 1.53256$ | $\nu_5 = 45.91$ |

-continued

| | | | |
|---|---|---|---|
| $r_{10} = -3.5900$ | | | |
| | $d_{10} = 0.5$ | $n_6 = 1.84666$ | $\nu_6 = 23.78$ |
| $r_{11} = -6.0180$ | | | |
| | $d_{11} = 0.1$ | | |
| $r_{12} = 7.0540$ | | | |
| | $d_{12} = 1.6$ | $n_7 = 1.72916$ | $\nu_7 = 54.68$ |
| $r_{13} = -7.0540$ | | | |
| | $d_{13} = 0.5$ | $n_8 = 1.72825$ | $\nu_8 = 28.46$ |
| $r_{14} = 4.8630$ | | | |
| | $d_{14} = 1.8$ | | |
| $r_{15} = \infty$ | | | |
| | $d_{15} = 3.5$ | $n_9 = 1.54869$ | $\nu_9 = 45.55$ |
| $r_{16} = \infty$ | | | |
| | $d_{16} = 7.718$ | $n_{10} = 1.695$ | $\nu_{10} = 42.16$ |
| $r_{17} = \infty$ | | | |
| | $d_{17} = 0.002$ | | |
| $r_{18} = \infty$ | | | |
| | $d_{18} = 1.082$ | $n_{11} = 1.695$ | $\nu_{11} = 42.16$ |
| $r_{19} = \infty$ | | | |

| First surface |
|---|
| $C = -\infty, P = -3.7620$ |
| $a_1 = 0, a_3 = -0.32941 \times 10^{-3}$ |
| $a_5 = 0.93942 \times 10^{-5}, a_7 = -0.98383 \times 10^{-7}$ |
| $a_9 = 0.3595 \times 10^{-9}$ |
| $0 < y < 4.79 \ldots f(y) < 0$ |
| $y = 4.79 \ldots f(y) = 0$ |
| $4.79 < y \ldots f(y) > 0$ |

| Second surface |
|---|
| $C = 0.0888, P = 13.5270$ |
| $a_1 = 0, a_3 = 0.56565 \times 10^{-2}$ |
| $a_5 = 0.10635 \times 10^{-3}, a_7 = -0.45497 \times 10^{-5}$ |

| Third surface |
|---|
| $C = 0.321, P = 2.4332$ |
| $a_1 = 0, a_3 = 0.18488 \times 10^{-1}$ |
| $a_5 = -0.19301 \times 10^{-2}, a_7 = 0.89778 \times 10^{-3}$ |

Although this embodiment likewise makes the correction of the distortion and the like by using the aspherical surface having the inflection point on the reflecting surface 7', if the correction is made through the imaging optical system 3, even an aspherical surface such that the reflecting surface 7' fails to have the inflection point may be employed.

Figure 8:
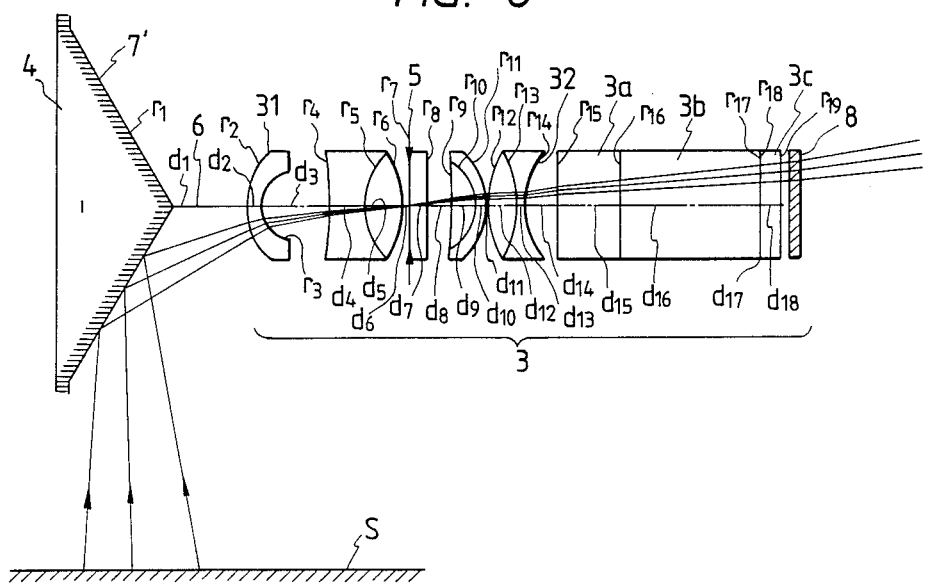

FIG. 8 shows a third embodiment, in which, in order to correct more effectively the optical aberration such as the astigmatic difference generated on the reflecting surface 7' which assumes the aspherical surface with the inflection point, an aspherical surface 31 having a convex hyperboloid that the radius of curvature on the periphery is larger than that in the vicinity of the optical axis is arranged on the front side of the aperture stop 5 of the imaging optical system 3, and a concave aspherical surface 32 that the radius of curvature on the periphery is smaller than that in the vicinity of the optical axis is disposed on the rear side thereof. By arranging the aspherical surfaces 31, 32 within the imaging optical system 3 in such a manner, an intensive divergent behavior on the periphery can be produced in the meridional direction, while on the other hand, a convergent behavior which is more intensive in the vicinity of the optical axis than on the periphery can be produced in the spherical segmental direction. Further, when the aspherical surfaces 31, 32 are disposed on the front and rear sides of the aperture stop 5, respectively, other optical aberrations can favorably be corrected.

Numerical data of the third embodiment are shown below.

| |
|---|
| $f = 3.849, F/5$ |

| | | | |
|---|---|---|---|
| $r_1 = -0.0001$ (A) (reflecting surface) | | | |
| | $d_1 = 4.1$ | | |
| $r_2 = 4.6352$ (A) | | | |
| | $d_2 = 0.7$ | $n_1 = 1.883$ | $\nu_1 = 40.78$ |
| $r_3 = 1.8674$ | | | |
| | $d_3 = 3.9106$ | | |
| $r_4 = -16.0896$ | | | |
| | $d_4 = 2.0$ | $n_2 = 1.697$ | $\nu_2 = 48.51$ |
| $r_5 = 4.0931$ | | | |
| | $d_5 = 2.0$ | $n_3 = 1.6727$ | $\nu_3 = 32.10$ |
| $r_6 = -5.3191$ | | | |
| | $d_6 = 0.5$ | | |
| $r_7 = \infty$ (stop) | | | |
| | $d_7 = 1.0$ | $n_4 = 1.51633$ | $\nu_4 = 64.15$ |
| $r_8 = \infty$ | | | |
| | $d_8 = 1.3$ | | |
| $r_9 = -45.2022$ | | | |
| | $d_9 = 1.4$ | $n_5 = 1.53256$ | $\nu_5 = 45.91$ |
| $r_{10} = -2.7134$ | | | |
| | $d_{10} = 0.5$ | $n_6 = 1.84666$ | $\nu_6 = 23.78$ |
| $r_{11} = -4.1150$ | | | |
| | $d_{11} = 0.1$ | | |
| $r_{12} = 5.6043$ | | | |
| | $d_{12} = 1.6$ | $n_7 = 1.72916$ | $\nu_7 = 54.68$ |
| $r_{13} = -7.0540$ | | | |
| | $d_{13} = 0.5$ | $n_8 = 1.72825$ | $\nu_8 = 28.46$ |
| $r_{14} = 4.4921$ (A) | | | |
| | $d_{14} = 1.8$ | | |
| $r_{15} = \infty$ | | | |
| | $d_{15} = 3.5$ | $n_9 = 1.54869$ | $\nu_9 = 45.55$ |
| $r_{16} = \infty$ | | | |
| | $d_{16} = 7.718$ | $n_{10} = 1.695$ | $\nu_{10} = 42.16$ |
| $r_{17} = \infty$ | | | |
| | $d_{17} = 0.002$ | | |
| $r_{18} = \infty$ | | | |
| | $d_{18} = 1.082$ | $n_{11} = 1.695$ | $\nu_{11} = 42.16$ |
| $r_{19} = \infty$ | | | |

| First surface |
|---|
| $C = -\infty, P = -2.9828$ |
| $a_1 = 0, a_3 = -0.34712 \times 10^{-3}$ |
| $a_5 = 0.10850 \times 10^{-4}, a_7 = -0.13672 \times 10^{-6}$ |
| $a_9 = 0.62392 \times 10^{-9}$ |
| $0 < y < 4.88 \ldots f(y) < 0$ |
| $y = 4.88 \ldots f(y) = 0$ |
| $4.88 < y \ldots f(y) > 0$ |

| Second surface |
|---|
| $C = 0.2957, P = -1.6474$ |
| $a_1 = 0, a_3 = -0.26149 \times 10^{-3}$ |
| $a_5 = 0.88790 \times 10^{-3}, a_7 = -0.12935 \times 10^{-4}$ |

| Third surface |
|---|
| $C = 0.2226, P = 1.3418$ |
| $a_1 = 0, a_3 = 0.51464 \times 10^{-3}$ |
| $a_5 = 0.23016 \times 10^{-4}, a_7 = -0.27431 \times 10^{-4}$ |

Figure 9:
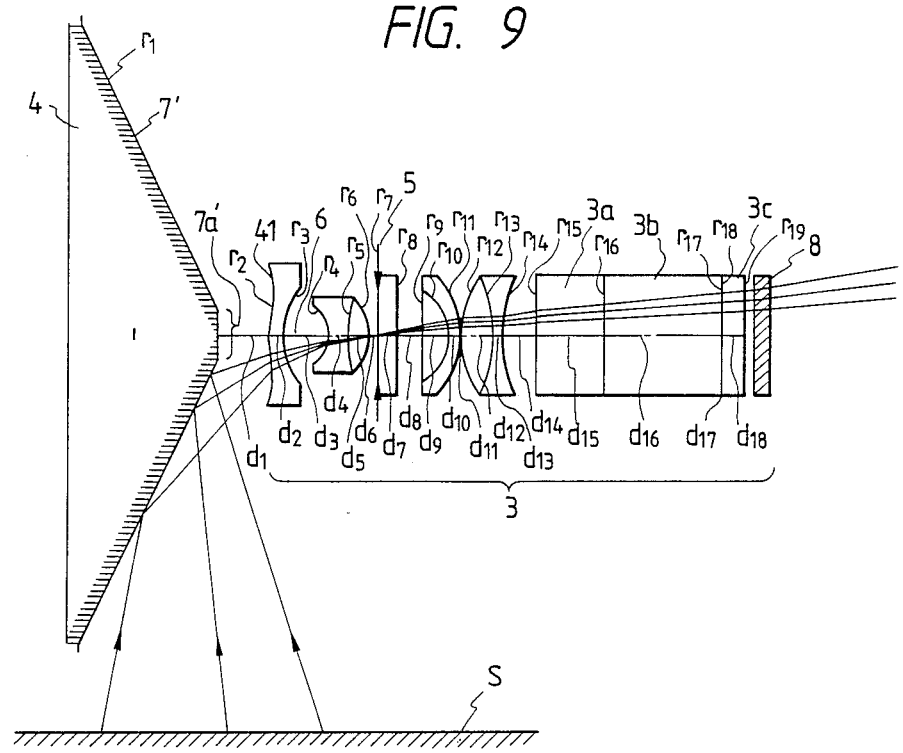
Figure 10:
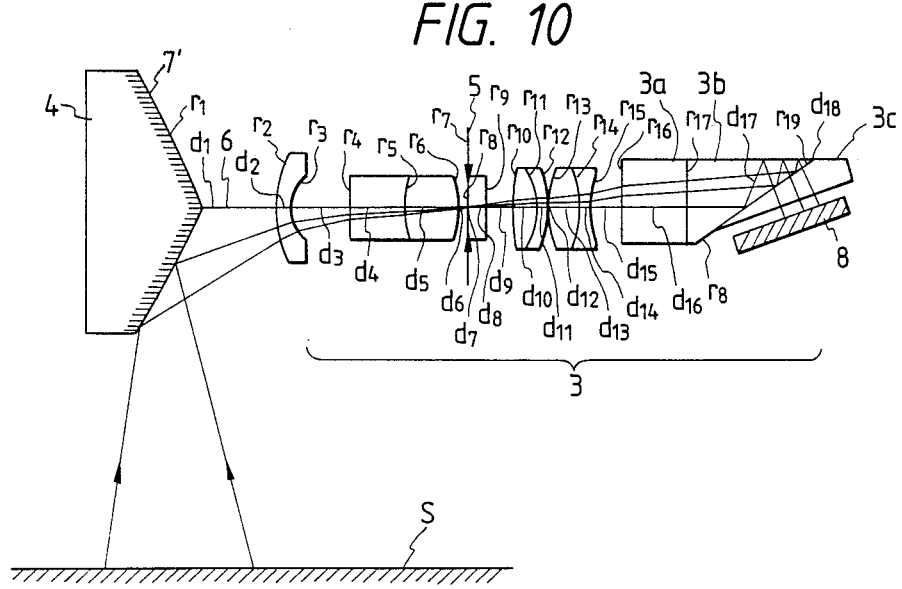
FIGS. 10 and 11 are views showing first and second comparison examples of the optical system for endoscopes, respectively.

FIG. 9 shows a fourth embodiment. This embodiment, in which the reflecting surface 7' is shaped into a conical form, is provided with an aspherical surface 41 which has an apex on the side of the reflecting mirror 4 in the imaging optical system 3 and which exerts progressively a negative power in going to the periphery. Now, in the case where the arrangement is made so that such a reflecting surface 7' as shown in FIG. 10 is conical and the imaging optical system 3 is not provided with any aspherical surface (a first comparison example), it has a function, as evident from its aberration diagram (refer to FIG. 21), that an image is inclined so that an imaging position is negative in the meridional direction and positive in the spherical segmental direction with the approach from the periphery to the optical axis. The aspherical surface 41 is provided with a view to correcting such a function. That is, this embodiment has the convergent behavior on the object side which is more intensive in the spherical segmental direction than in the meridional direction, thus reducing the optical aberration such as the astigmatic difference produced on the reflecting surface 7' of the reflecting mirror 4. Since, however, the image formed at the center portion of the reflecting surface near the optical axis is small, the conical form may not necessarily be used. The above is attained by reducing a manufacturing cost in such a way that the reflecting mirror 4 per se is configured as a conical mirror which is easy to make and an aspherical surface lens capable of being molded is used on the side of the imaging optical system to diminish the optical aberration such as the astigmatic difference because, when material with high hardness is used to prevent the reflecting mirror 4 from being damaged in particular, a conventional working machine makes it difficult to form the aspherical surface and the resultant product becomes expensive.

Numerical data of the fourth embodiment are shown below.

| $f = 0$, F/0.003 | | | |
|---|---|---|---|
| $r_1 = 0$ (A) (reflecting surface) | | | |
| | $d_1 = 2.0$ | | |
| $r_2 = 0.0001$ (A) | | | |
| | $d_2 = 0.7$ | $n_1 = 1.883$ | $\nu_1 = 40.78$ |
| $r_3 = 3.6765$ | | | |
| | $d_3 = 2.4667$ | | |
| $r_4 = -1.7710$ | | | |
| | $d_4 = 1.0$ | $n_2 = 1.697$ | $\nu_2 = 48.51$ |
| $r_5 = 6.2769$ | | | |
| | $d_5 = 1.0$ | $n_3 = 1.6727$ | $\nu_3 = 32.10$ |
| $r_6 = -2.5834$ | | | |
| | $d_6 = 0.5$ | | |
| $r_7 = \infty$ (stop) | | | |
| | $d_7 = 1.0$ | $n_4 = 1.51633$ | $\nu_4 = 64.15$ |
| $r_8 = \infty$ | | | |
| | $d_8 = 1.3$ | | |
| $r_9 = 103.0259$ | | | |
| | $d_9 = 1.4$ | $n_5 = 1.53256$ | $\nu_5 = 45.91$ |
| $r_{10} = -2.5404$ | | | |
| | $d_{10} = 0.5$ | $n_6 = 1.84666$ | $\nu_6 = 23.78$ |
| $r_{11} = -4.1065$ | | | |
| | $d_{11} = 0.1$ | | |
| $r_{12} = 5.4600$ | | | |
| | $d_{12} = 1.6$ | $n_7 = 1.72916$ | $\nu_7 = 54.68$ |
| $r_{13} = -7.0540$ | | | |
| | $d_{13} = 0.5$ | $n_8 = 1.72825$ | $\nu_8 = 28.46$ |
| $r_{14} = 7.7768$ | | | |
| | $d_{14} = 1.8$ | | |
| $r_{15} = \infty$ | | | |
| | $d_{15} = 3.5$ | $n_9 = 1.54869$ | $\nu_9 = 45.55$ |
| $r_{16} = \infty$ | | | |
| | $d_{16} = 6.0362$ | $n_{10} = 1.695$ | $\nu_{10} = 42.16$ |
| $r_{17} = \infty$ | | | |
| | $d_{17} = 0.002$ | | |
| $r_{18} = \infty$ | | | |
| | $d_{18} = 1.082$ | $n_{11} = 1.695$ | $\nu_{11} = 42.16$ |
| $r_{19} = \infty$ | | | |
| First surface | | | |
| $C = -\infty$, $P = -4.0000$ | | | |
| $a_1 = 0$ | | | |
| Second surface | | | |
| $C = -\infty$, $P = -54.8277$ | | | |
| $a_1 = 0$, $a_3 = -0.37451 \times 10^{-2}$ | | | |
| $a_5 = 0.37255 \times 10^{-22}$ | | | |

Next, numerical data of the first comparison example described above are listed below.

| $f = 3.812$, F/5 | | | |
|---|---|---|---|
| $r_1 = 0$ (A) (reflecting surface) | | | |
| | $d_1 = 4.1$ | | |
| $r_2 = 7.0010$ | | | |
| | $d_2 = 0.7$ | $n_1 = 1.883$ | $\nu_1 = 40.78$ |
| $r_3 = 2.1660$ | | | |
| | $d_3 = 3.36$ | | |
| $r_4 = -14.8050$ | | | |
| | $d_4 = 3.0$ | $n_2 = 1.697$ | $\nu_2 = 48.51$ |
| $r_5 = 5.4050$ | | | |
| | $d_5 = 3.0$ | $n_3 = 1.6727$ | $\nu_3 = 32.10$ |
| $r_6 = -5.4050$ | | | |
| | $d_6 = 0$ | | |
| $r_7 = \infty$ (stop) | | | |
| | $d_7 = 0.93$ | | |
| $r_8 = \infty$ | | | |
| | $d_8 = 0.5$ | $n_4 = 1.51633$ | $\nu_4 = 64.15$ |
| $r_9 = \infty$ | | | |
| | $d_9 = 1.2$ | | |
| $r_{10} = 15.3440$ | | | |
| | $d_{10} = 1.4$ | $n_5 = 1.53256$ | $\nu_5 = 45.91$ |
| $r_{11} = -3.5900$ | | | |
| | $d_{11} = 0.5$ | $n_6 = 1.84666$ | $\nu_6 = 23.78$ |
| $r_{12} = -6.0180$ | | | |
| | $d_{12} = 0.1$ | | |
| $r_{13} = 7.0540$ | | | |
| | $d_{13} = 1.58$ | $n_7 = 1.72916$ | $\nu_7 = 54.68$ |
| $r_{14} = -7.0540$ | | | |
| | $d_{14} = 0.5$ | $n_8 = 1.72825$ | $\nu_8 = 28.46$ |
| $r_{15} = 4.8630$ | | | |
| | $d_{15} = 1.48$ | | |
| $r_{16} = \infty$ | | | |
| | $d_{16} = 2.57$ | $n_9 = 1.54869$ | $\nu_9 = 45.55$ |
| $r_{17} = \infty$ | | | |
| | $d_{17} = 1.5$ | $n_{10} = 1.51633$ | $\nu_{10} = 64.15$ |
| $r_{18} = \infty$ | | | |
| | $d_{18} = 7.718$ | $n_{11} = 1.695$ | $\nu_{11} = 42.16$ |
| $r_{19} = \infty$ | | | |
| First surface | | | |
| $C = -\infty$, $P = -2.8$ | | | |
| $a_1 = 0$ | | | |

Also, in the embodiment, an apex 7'a of the reflecting surface 7' which is out of the range of observation in fact is shaped into a plane-like form in order to enhance the workability of the reflecting surface 7' and undergoes antireflection treatment (for instance, black treatment). The apex 7'a may be formed as a spherical surface, not a plane surface.

Figure 11:
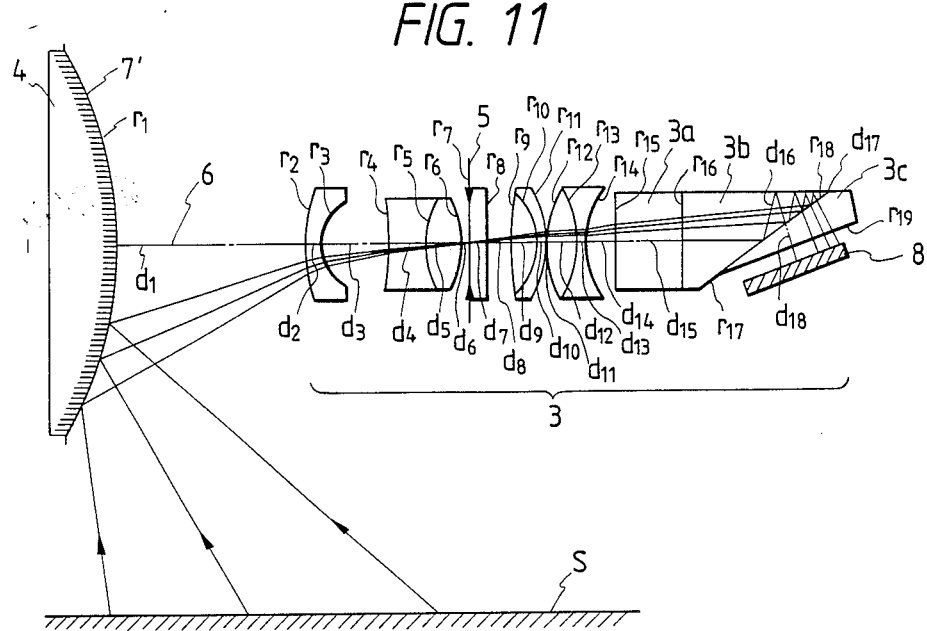

FIG. 11 shows a second comparison example in which the reflecting surface 7' assumes a spherical surface whose center coincides with the optical axis 6 of the imaging optical system 3 and no aspherical surface is included in the imaging optical system 3. Although the spherical reflecting surface 7' is small in amount of the astigmatic difference produced on the reflecting surface as compared with the conical surface and the like, it has the same function as the conical surface. However, its divergent behavior is more intensive in the meridional direction rather than in the spherical segmental direction. In order to correct such behavior, the entire system is set so that the characteristic of the astigmatism produced in the imaging optical system 3 is opposite to that on the reflecting surface 7'. However, since the divergent behavior in the meridional direction which is generated in the portion adjacent to the optical axis of the reflecting surface 7' is strong and the divergent behavior in the spherical segmental direction is progressively weak in going to the periphery, the combination with the imaging optical system 3 will increase the astigmatic difference on the periphery.

The following is numerical data of the second comparison example.

| $f = 4.240$, F/5 | |
|---|---|
| $r_1 = -19.4120$ | |

-continued

| | $d_1 = 10.4894$ | | |
|---|---|---|---|
| $r_2 = 9.2378$ | | | |
| | $d_2 = 0.7$ | $n_1 = 1.883$ | $\nu_1 = 40.78$ |
| $r_3 = 2.4782$ | | | |
| | $d_3 = 3.91$ | | |
| $r_4 = -13.8879$ | | | |
| | $d_4 = 2.0$ | $n_2 = 1.697$ | $\nu_2 = 48.51$ |
| $r_5 = 4.5867$ | | | |
| | $d_5 = 2.0$ | $n_3 = 1.6727$ | $\nu_3 = 32.10$ |
| $r_6 = -5.2342$ | | | |
| | $d_6 = 0.5$ | | |
| $r_7 = \infty$ | | | |
| | $d_7 = 1.0$ | $n_4 = 1.51633$ | $\nu_4 = 64.15$ |
| $r_8 = \infty$ | | | |
| | $d_8 = 1.3$ | | |
| $r_9 = 18.1972$ | | | |
| | $d_9 = 1.4$ | $n_5 = 1.53256$ | $\nu_5 = 45.91$ |
| $r_{10} = -3.5432$ | | | |
| | $d_{10} = 0.5$ | $n_6 = 1.84666$ | $\nu_6 = 23.78$ |
| $r_{11} = -5.7022$ | | | |
| | $d_{11} = 0.1$ | | |
| $r_{12} = 6.5549$ | | | |
| | $d_{12} = 1.6$ | $n_7 = 1.72916$ | $\nu_7 = 54.68$ |
| $r_{13} = -5.5025$ | | | |
| | $d_{13} = 0.5$ | $n_8 = 1.72825$ | $\nu_8 = 28.46$ |
| $r_{14} = 4.7504$ | | | |
| | $d_{14} = 1.8$ | | |
| $r_{15} = \infty$ | | | |
| | $d_{15} = 3.5$ | $n_9 = 1.54869$ | $\nu_9 = 45.55$ |
| $r_{16} = \infty$ | | | |
| | $d_{16} = 7.718$ | $n_{10} = 1.695$ | $\nu_{10} = 42.16$ |
| $r_{17} = \infty$ | | | |
| | $d_{17} = 0.002$ | | |
| $r_{18} = \infty$ | | | |
| | $d_{18} = 1.082$ | $n_{11} = 1.695$ | $\nu_{11} = 42.15$ |
| $r_{19} = \infty$ | | | |

Note: The above data are the values relative to only the imaging optical system except for the reflecting mirror.

Figure 12:
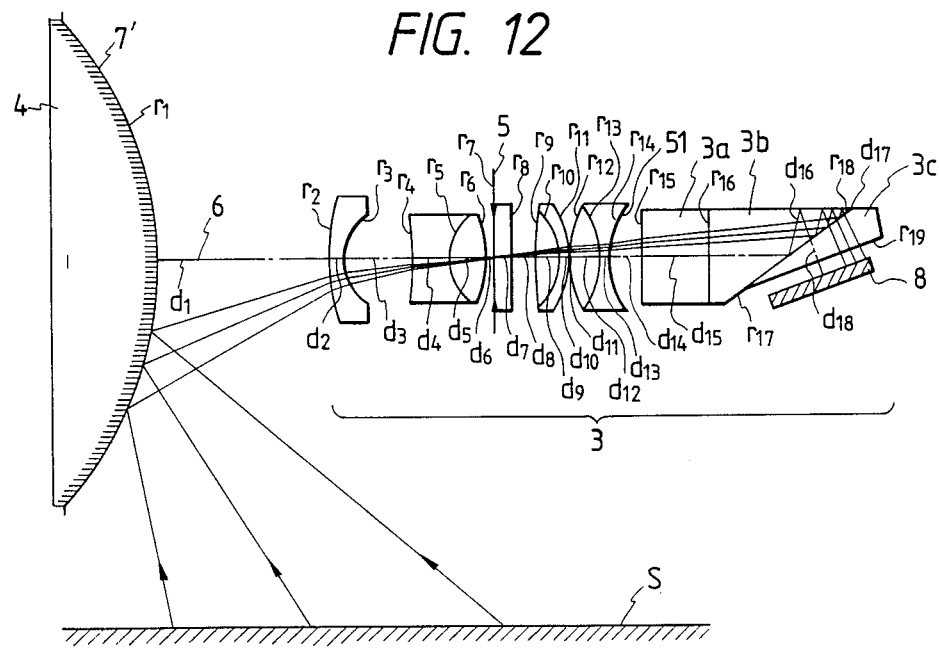
FIGS. 12 to 16 are views showing fifth to ninth embodiments of the optical system for endoscopes according to the present invention, respectively.

FIG. 12 depicts a fifth embodiment. In this embodiment, the reflecting surface 7' exhibits a spherical surface and the imaging optical system 3 is provided with a concave aspherical surface 51, on the rear side of the aperture stop 5, whose radius of curvature decreases progressively in going from the vicinity of the optical axis to the periphery. Thereby, in the imaging optical system 3 per se, the convergent behavior in the meridional direction, adjacent to the position of a half of the lowest image height, increases and the astigmatic difference on the periphery reduces. Further, the convergent behavior in the meridional direction on the periphery is suppressed so that the astigmatic difference in the spherical segmental direction diminishes.

The following is numerical data of the fifth embodiment.

| $f = 4.202$, F/4 | | | |
|---|---|---|---|
| $r_1 = -19.5031$ | | | |
| | $d_1 = 9.5$ | | |
| $r_2 = 11.0945$ | | | |
| | $d_2 = 0.7$ | $n_1 = 1.883$ | $\nu_1 = 40.78$ |
| $r_3 = 2.9399$ | | | |
| | $d_3 = 3.91$ | | |
| $r_4 = -15.2516$ | | | |
| | $d_4 = 2.0$ | $n_2 = 1.697$ | $\nu_2 = 48.51$ |
| $r_5 = 2.9701$ | | | |
| | $d_5 = 2.0$ | $n_3 = 1.6727$ | $\nu_3 = 32.10$ |
| $r_6 = -6.7579$ | | | |
| | $d_6 = -6.7579$ | | |
| $r_7 = \infty$ | | | |
| | $d_7 = 1.0$ | $n_4 = 1.51633$ | $\nu_4 = 64.15$ |
| $r_8 = \infty$ | | | |
| | $d_8 = 1.3$ | | |
| $r_9 = 18.6382$ | | | |
| | $d_9 = 1.4$ | $n_5 = 1.53256$ | $\nu_5 = 45.91$ |
| $r_{10} = -3.6501$ | | | |

-continued

| | $d_{10} = 0.5$ | $n_6 = 1.84666$ | $\nu_6 = 23.78$ |
|---|---|---|---|
| $r_{11} = -5.2646$ | | | |
| | $d_{11} = 0.1$ | | |
| $r_{12} = 6.7656$ | | | |
| | $d_{12} = 1.6$ | $n_7 = 1.72916$ | $\nu_7 = 54.68$ |
| $r_{13} = -4.8995$ | | | |
| | $d_{13} = 0.5$ | $n_8 = 1.72825$ | $\nu_8 = 28.46$ |
| $r_{14} = 5.4669$ (A) | | | |
| | $d_{14} = 1.8$ | | |
| $r_{15} = \infty$ | | | |
| | $d_{15} = 3.5$ | $n_9 = 1.54869$ | $\nu_9 = 45.55$ |
| $r_{16} = \infty$ | | | |
| | $d_{16} = 7.718$ | $n_{10} = 1.695$ | $\nu_{10} = 42.16$ |
| $r_{17} = \infty$ | | | |
| | $d_{17} = 0.002$ | | |
| $r_{18} = \infty$ | | | |
| | $d_{18} = 1.082$ | $n_{11} = 1.695$ | $\nu_{11} = 42.16$ |
| $r_{19} = \infty$ | | | |

| Fourteen surface |
|---|
| $C = 0.1829$, $P = 1.3951$ |
| $a_1 = 0$, $a_3 = 0.43767 \times 10^{-3}$ |
| $a_5 = 0.27144 \times 10^{-4}$, $a_7 = -0.25384 \times 10^{-4}$ |
| $a_9 = 0.51394 \times 10^{-5}$ |

Further, the position of the aspherical surface disposed in the imaging optical system 3 may also be assumed on the front side of the aperture stop 5 and even the configuration of the convex aspherical surface that the radius of curvature on the periphery increases progressively as compared with that in the vicinity of the optical axis brings about the same effect. As well, an aspherial surface different in configuration may be further provided, in addition to the aspherical surface 51, to correct other optical aberrations.

Figure 13:
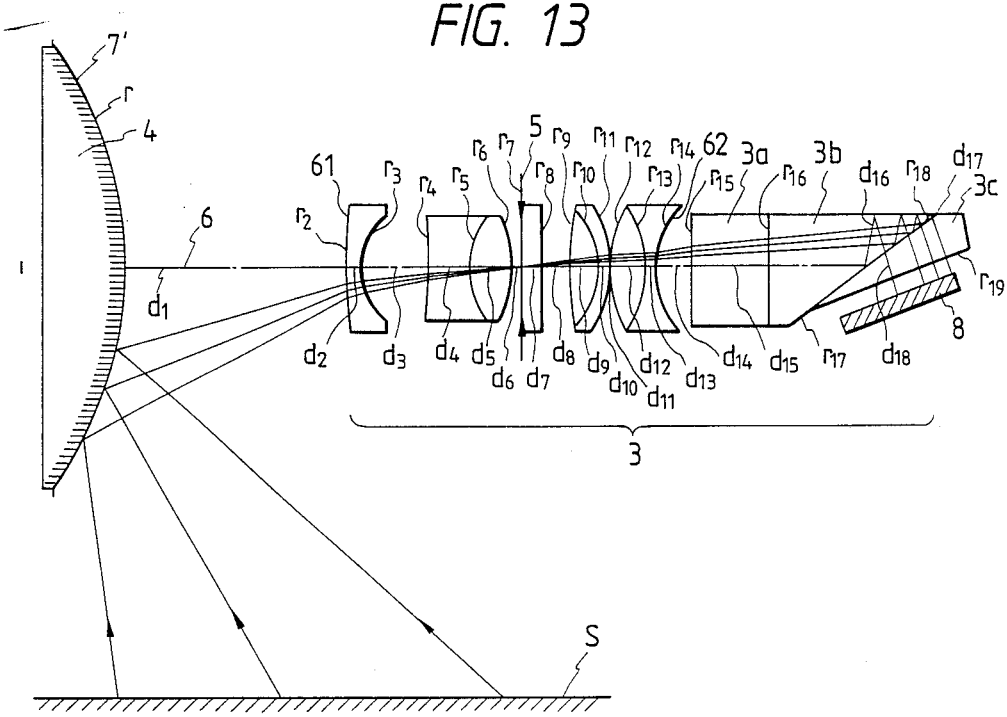

FIG. 13 shows a sixth embodiment. In this embodiment, the reflecting surface 7' exhibits a spherical surface, and a convex aspherical surface 61 and a concave aspherical surface 62 are provided on the front and rear sides of the aperture stop 5, respectively, so that, while the astigmatism in the meridional direction is kept small, the convergent behavior in the meridional direction, adjacent to the position of a half of the lowest image height, is made stronger and the astigmatic difference on the periphery is made smaller in the imaging optical system 3 per se.

Numerical data of the sixth embodiment are shown below.

| $f = 4.418$, F/5 | | | |
|---|---|---|---|
| $r_1 = -17.6933$ | | | |
| | $d_1 = 10.4967$ | | |
| $r_2 = 19.4977$ (A) | | | |
| | $d_2 = 0.7$ | $n_1 = 1.883$ | $\nu_1 = 40.78$ |
| $r_3 = 2.9416$ | | | |
| | $d_3 = 3.3853$ | | |
| $r_4 = -24.9057$ | | | |
| | $d_4 = 2.0$ | $n_2 = 1.697$ | $\nu_2 = 48.51$ |
| $r_5 = 3.9828$ | | | |
| | $d_5 = 2.0$ | $n_3 = 1.6727$ | $\nu_3 = 32.10$ |
| $r_6 = -6.0305$ | | | |
| | $d_6 = 0.5$ | | |
| $r_7 = \infty$ | | | |
| | $d_7 = 1.0$ | $n_4 = 1.51633$ | $\nu_4 = 64.15$ |
| $r_8 = \infty$ | | | |
| | $d_8 = 1.3$ | | |
| $r_9 = 16.3914$ | | | |
| | $d_9 = 1.4$ | $n_5 = 1.53256$ | $\nu_5 = 45.91$ |
| $r_{10} = -3.7784$ | | | |
| | $d_{10} = 0.5$ | $n_6 = 1.84666$ | $\nu_6 = 23.78$ |
| $r_{11} = -5.6195$ | | | |
| | $d_{11} = 0.1$ | | |
| $r_{12} = 6.3640$ | | | |
| | $d_{12} = 1.6$ | $n_7 = 1.72916$ | $\nu_7 = 54.68$ |

-continued

| | | | |
|---|---|---|---|
| $r_{13} = -5.2235$ | | | |
| | $d_{13} = 0.5$ | $n_8 = 1.72825$ | $v_8 = 28.46$ |
| $r_{14} = 4.5926$ (A) | | | |
| | $d_{14} = 1.8$ | | |
| $r_{15} = \infty$ | | | |
| | $d_{15} = 3.5$ | $n_9 = 1.54869$ | $v_9 = 45.55$ |
| $r_{16} = \infty$ | | | |
| | $d_{16} = 7.718$ | $n_{10} = 1.695$ | $v_{10} = 42.16$ |
| $r_{17} = \infty$ | | | |
| | $d_{17} = 0.002$ | | |
| $r_{18} = \infty$ | | | |
| | $d_{18} = 1.082$ | $n_{11} = 1.695$ | $v_{11} = 42.16$ |
| $r_{19} = \infty$ | | | |

Figure 14:
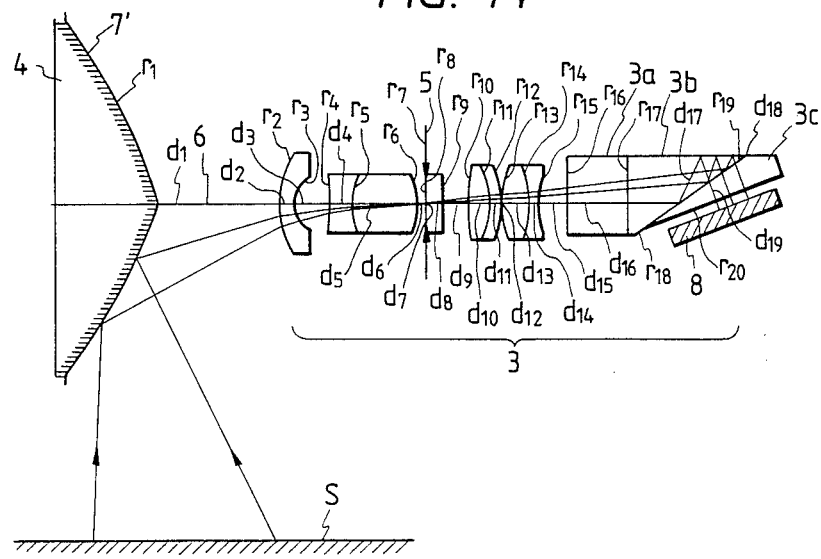

Second surface $C = 0.0513, P = 4.066$
$a_1 = 0, a_3 = -0.59956 \times 10^{-4}$
$a_5 = -0.11277 \times 10^{-3}, a_7 = 0.46381 \times 10^{-5}$
$a_9 = 0.10399 \times 10^5$ Fourteen surface $C = 0.2177, P = 1.213$
$a_1 = 0, a_3 = 0.35629 \times 10^{-3}$
$a_5 = 0.52280 \times 10^{-4}, a_7 = 0.30042 \times 10^4$
$a_9 = 0.48682 \times 10^{-5}$ FIG. 14 shows a seventh embodiment. This embodiment is the same in basic structure and feature as the first embodiment, though different somewhat is position of the aperture stop 5 from the first embodiment of FIG. 5, and as such its explanation is omitted.

Numerical data of the seventh embodiment are described below.

$f = 1, F/5$

| | | | |
|---|---|---|---|
| $r_1 = 0$ (A) (reflecting surface) | | | |
| | $d_1 = 1.0564$ | | |
| $r_2 = 2.2042$ | | | |
| | $d_2 = 0.1898$ | $n_1 = 1.883$ | $v_1 = 40.78$ |
| $r_3 = 0.6008$ | | | |
| | $d_3 = 0.955$ | | |
| $r_4 = -5.1297$ | | | |
| | $d_4 = 0.8103$ | $n_2 = 1.697$ | $v_2 = 48.51$ |
| $r_5 = 1.6712$ | | | |
| | $d_5 = 0.8631$ | $n_3 = 1.6727$ | $v_3 = 32.10$ |
| $r_6 = -1.5368$ | | | |
| | $d_6 = 0.1355$ | | |
| $r_7 = \infty$ (stop) | | | |
| | $d_7 = 0$ | | |
| $r_8 = \infty$ | | | |
| | $d_8 = 0.2711$ | $n_4 = 1.51633$ | $v_4 = 64.15$ |
| $r_9 = \infty$ | | | |
| | $d_9 = 0.3253$ | | |
| $r_{10} = 4.1594$ | | | |
| | $d_{10} = 0.3795$ | $n_5 = 1.53256$ | $v_5 = 45.91$ |
| $r_{11} = -0.9732$ | | | |
| | $d_{11} = 0.1355$ | $n_6 = 1.84666$ | $v_6 = 23.78$ |
| $r_{12} = -1.6313$ | | | |
| | $d_{12} = 0.0271$ | | |
| $r_{13} = 1.9122$ | | | |
| | $d_{13} = 0.4283$ | $n_7 = 1.72916$ | $v_7 = 54.68$ |
| $r_{14} = -1.9122$ | | | |
| | $d_{14} = 0.1355$ | $n_8 = 1.72825$ | $v_8 = 28.46$ |
| $r_{15} = 1.3182$ | | | |
| | $d_{15} = 0.488$ | | |
| $r_{16} = \infty$ | | | |
| | $d_{16} = 0.9489$ | $n_9 = 1.51633$ | $v_9 = 64.15$ |
| $r_{17} = \infty$ | | | |
| | $d_{17} = 2.0922$ | $n_{10} = 1.695$ | $v_{10} = 42.16$ |
| $r_{18} = \infty$ | | | |
| | $d_{18} = 0.0005$ | | |
| $r_{19} = \infty$ | | | |
| | $d_{19} = 0.2933$ | $n_{11} = 1.695$ | $v_{11} = 42.16$ |
| $r_{20} = \infty$ | | | |

Figure 15:
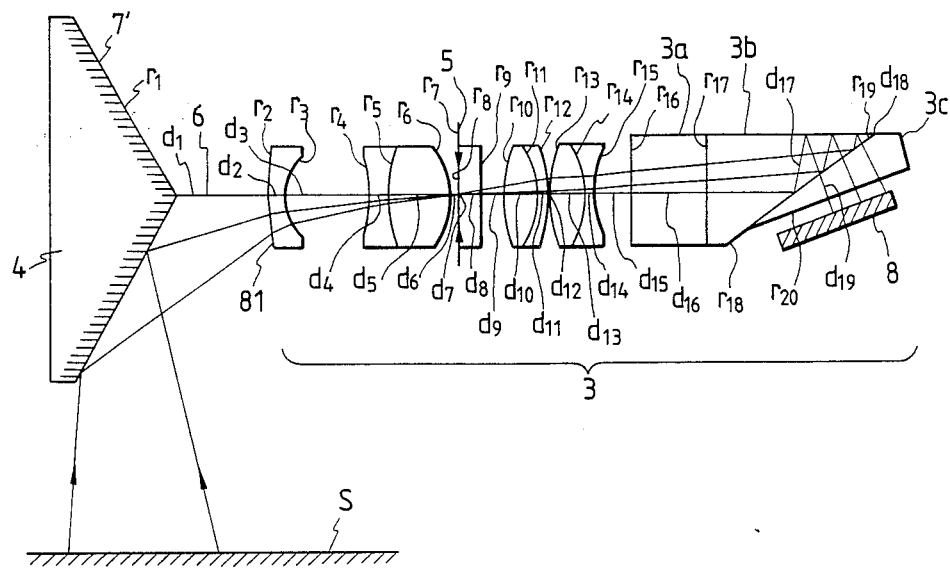

First surface $C = -\infty, P = -5.0865$
$a_1 = 0, a_3 = -0.36108 \times 10^{-1}$ -continued $a_5 = 0.99131 \times 10^{-2},$
$a_7 = -0.11371 \times 10^{-2},$
$a_9 = 0.48915 \times 10^{-4},$
$0 < y < 1.696 \ldots f(y) < 0$
$y = 1.696 \ldots f(y) = 0$
$1.696 < y \ldots f(y) > 0$ FIG. 15 shows an eighth embodiment, in which the reflecting surface 7' is conical and a first surface 81 of a first lens is configured as an aspherical surface shaped virtually into a conical form having an apex on the side of the reflecting mirror 4 in order to correct a stronger divergent behavior generated in the spherical segmental direction than in the meridional direction, so that a stronger convergent behavior is caused in the spherical segmental direction, on the object side, than in the meridional direction, thereby diminishing the optical aberration such as the astigmatic difference produced on the reflecting surface 7'. However, since the image formed at the center portion of the reflecting surface on the optical axis is small, the surface may not necessarily be configured as the conical form and as such this embodiment has the same advantage as described in relation to the fourth embodiment of FIG. 9.

Numerical data of the eighth embodiment are as follows:

$f = 1, F/5$

| | | | |
|---|---|---|---|
| $r_1 = 0$ (A) (reflecting surface) | | | |
| | $d_1 = 0.5795$ | | |
| $r_2 = 1.0591$ (A) | | | |
| | $d_2 = 0.1433$ | $n_1 = 1.883$ | $v_1 = 40.78$ |
| $r_3 = 0.53$ | | | |
| | $d_3 = 0.5537$ | | |
| $r_4 = -5.2225$ | | | |
| | $d_4 = 0.6141$ | $n_2 = 1.697$ | $v_2 = 48.51$ |
| $r_5 = 2.005$ | | | |
| | $d_5 = 0.5278$ | $n_3 = 1.6727$ | $v_3 = 32.10$ |
| $r_6 = -1.0903$ | | | |
| | $d_6 = 0.1024$ | | |
| $r_7 = \infty$ (stop) | | | |
| | $d_7 = 0$ | | |
| $r_8 = \infty$ | | | |
| | $d_8 = 0.2047$ | $n_4 = 1.51633$ | $v_4 = 64.15$ |
| $r_9 = \infty$ | | | |
| | $d_9 = 0.2456$ | | |
| $r_{10} = 3.141$ | | | |
| | $d_{10} = 0.2866$ | $n_5 = 1.53256$ | $v_5 = 45.91$ |
| $r_{11} = -0.7349$ | | | |
| | $d_{11} = 0.1024$ | $n_6 = 1.84666$ | $v_6 = 23.78$ |
| $r_{12} = -1.2319$ | | | |
| | $d_{12} = 0.0205$ | | |
| $r_{13} = 1.4440$ | | | |
| | $d_{13} = 0.3234$ | $n_7 = 1.72916$ | $v_7 = 54.68$ |
| $r_{14} = -1.4440$ | | | |
| | $d_{14} = 0.1024$ | $n_8 = 1.72825$ | $v_8 = 28.46$ |
| $r_{15} = 0.9955$ | | | |
| | $d_{15} = 0.3685$ | | |
| $r_{16} = \infty$ | | | |
| | $d_{16} = 0.7165$ | $n_9 = 1.51633$ | $v_9 = 64.15$ |
| $r_{17} = \infty$ | | | |
| | $d_{17} = 1.5799$ | $n_{10} = 1.695$ | $v_{10} = 42.16$ |
| $r_{18} = \infty$ | | | |
| | $d_{18} = 0.0004$ | | |
| $r_{19} = \infty$ | | | |
| | $d_{19} = 0.2215$ | $n_{11} = 1.695$ | $v_{11} = 42.16$ |
| $r_{20} = \infty$ | | | |

First surface $C = -\infty, P = -7.4345$
$a_1 (i = 1, 2, 3, \ldots) = 0$

Figure 16:
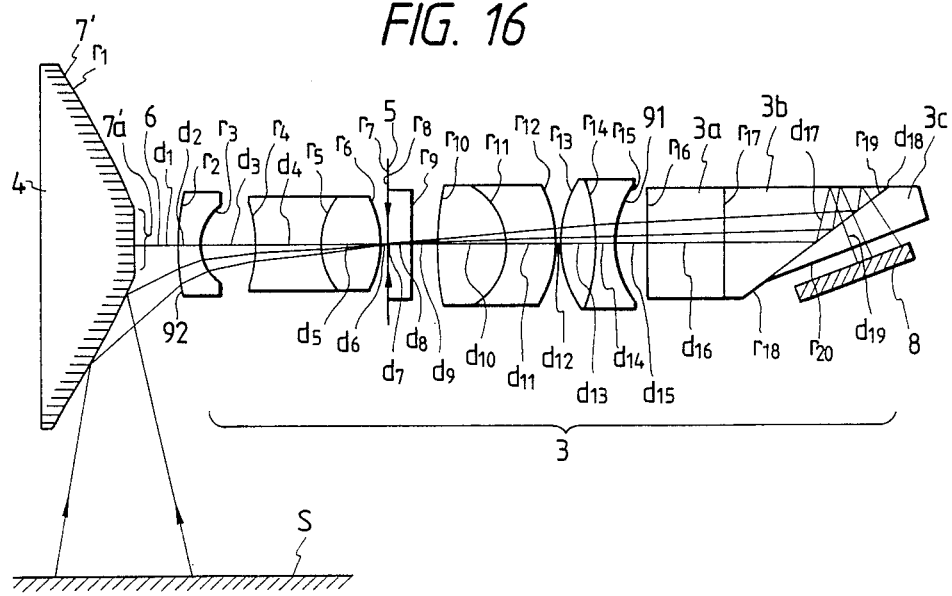
Figure 17:
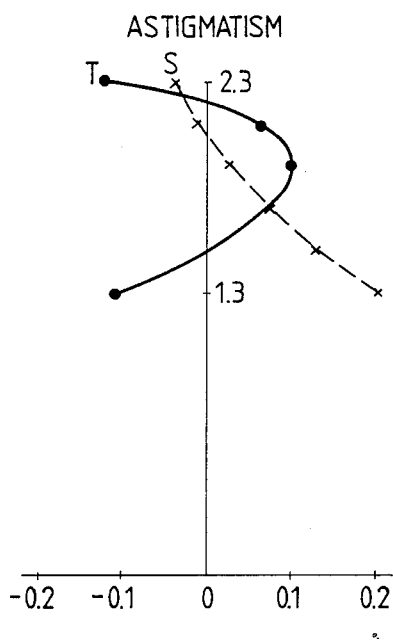
FIG. 17 is a diagram showing astigmatism of the first embodiment depicted in FIG. 5.
Figure 18:
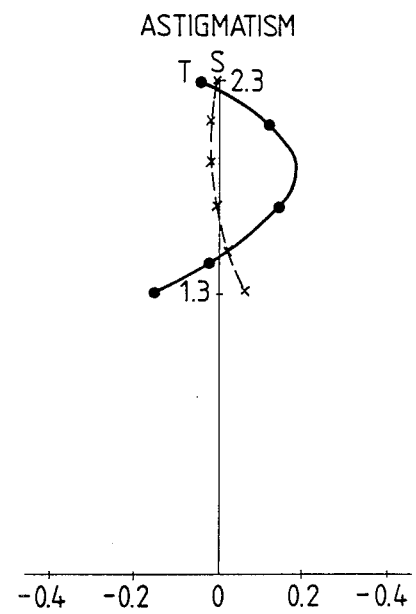
FIGS. 18 to 20 are diagrams showing astigmatism of the second to fourth embodiments depicted in FIGS. 7 to 9, respectively.
Figure 19:
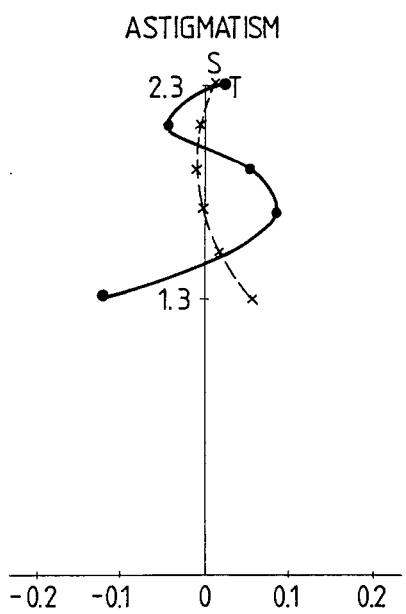
Figure 20:
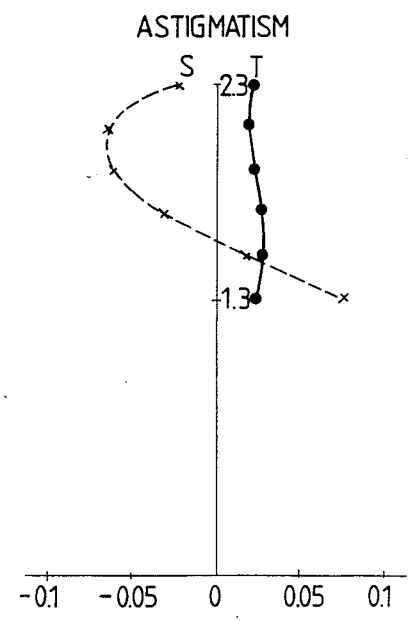

Second surface $C = 1.059, P = -68.3397$
$a_1 = 0, a_3 = -0.49698 \times 10^{-25},$ -continued $a_5 = -0.24368 \times 10^{-26}$,
$a_7 = -0.58151 \times 10^{-25}$,
$a_9 = -0.13877 \times 10^{-23}$, FIG. 16 shows a ninth embodiment, which is constructed to bring about the same effect by making use of aspherical surfaces which are not conical surfaces in the imaging optical system 3 and for the reflecting surface 7', as a modification of the eighth embodiment. That is, a rearmost lens surface 91 of the imaging optical system 3 is shaped into the aspherical surface to make the correction of the aberration (chiefly, the astigmatism difference) produced on the reflecting surface 7'. This is such that, in regard to the rearmost lens surface 91, a negative lens function is gradually increased in separating from the optical axis and the divergent behavior is caused in the meridional direction to counterbalance the divergent behavior produced, in the spherical segmental direction, on the reflecting surface 7', thus making the correction. In such an instance, the surface to be aspherical is not limited to the rearmost lens surface 91 and, by way of example, a first surface 92 may be configured as the aspherical surface to thereby facilitate the aberration correction. Also, the top surface 7'a of the reflecting surface 7' is constructed so that the apex of the reflecting surface 7' which is out of the range of observation as a matter of fact is shaped into a plane surface for the antireflection treatment (for example, black treatment) with the result that the workability of the reflecting surface 7' is enhanced. In particular, the top surface 7'a is not limited to the plane surface and there is no problem even if it is spherical.

Numerical data of the ninth embodiment are as follows:

| $f = 1$, F/5 | | | |
|---|---|---|---|
| $r_1 = 0$ (A) (reflecting surface) | | | |
| | $d_1 = 0.6211$ | | |
| $r_2 = 6.8283$ | | | |
| | $d_2 = 0.2899$ | $n_1 = 1.883$ | $\nu_1 = 40.78$ |
| $r_3 = 0.9125$ | | | |
| | $d_3 = 1.2361$ | | |
| $r_4 = -2.1728$ | | | |
| | $d_4 = 1.2422$ | $n_2 = 1.697$ | $\nu_2 = 48.51$ |
| $r_5 = 1.3826$ | | | |
| | $d_5 = 1.2422$ | $n_3 = 1.6727$ | $\nu_3 = 32.10$ |
| $r_6 = -2.3128$ | | | |
| | $d_6 = 0.207$ | | |
| $r_7 = \infty$ (stop) | | | |
| | $d_7 = 0$ | | |
| $r_8 = \infty$ | | | |
| | $d_8 = 0.4141$ | $n_4 = 1.51633$ | $\nu_4 = 64.15$ |
| $r_9 = \infty$ | | | |
| | $d_9 = 0.5383$ | | |
| $r_{10} = 9.3915$ | | | |
| | $d_{10} = 1.2422$ | $n_5 = 1.53256$ | $\nu_5 = 45.91$ |
| $r_{11} = -1.3952$ | | | |
| | $d_{11} = 1.0468$ | $n_6 = 1.84666$ | $\nu_6 = 23.78$ |
| $r_{12} = -2.3241$ | | | |
| | $d_{12} = 0.1194$ | | |
| $r_{13} = 2.4821$ | | | |
| | $d_{13} = 0.7825$ | $n_7 = 1.72916$ | $\nu_7 = 54.68$ |
| $r_{14} = -2.7002$ | | | |
| | $d_{14} = 0.2144$ | $n_8 = 1.72825$ | $\nu_8 = 28.46$ |
| $r_{15} = 2.1043$ (A) | | | |
| | $d_{15} = 0.7453$ | | |
| $r_{16} = \infty$ | | | |
| | $d_{16} = 1.4493$ | $n_9 = 1.51633$ | $\nu_9 = 64.15$ |
| $r_{17} = \infty$ | | | |
| | $d_{17} = 3.1959$ | $n_{10} = 1.695$ | $\nu_{10} = 42.16$ |
| $r_{18} = \infty$ | | | |
| | $d_{18} = 0.0008$ | | |
| $r_{19} = \infty$ | | | |
| | $d_{19} = 0.448$ | $n_{11} = 1.695$ | $\nu_{11} = 42.16$ |
| $r_{20} = \infty$ | | | |

| First surface |
|---|
| $C = -\infty$, $P = -5.2935$ |
| $a_1 = 0$, $a_3 = -0.10130 \times 10^1$, |
| $a_5 = 0.11917 \times 10^{-2}$, |
| $a_7 = -0.58590 \times 10^{-4}$, |
| $a_9 = 0.10803 \times 10^{-5}$, |

| Second surface |
|---|
| $C = 2.104$, $P = 1.8718$ |
| $a_1 = 0$, $a_3 = -0.42042 \times 10^{-25}$, |
| $a_5 = -0.24520 \times 10^{-24}$, |
| $a_7 = 0$ |

Figure 21:
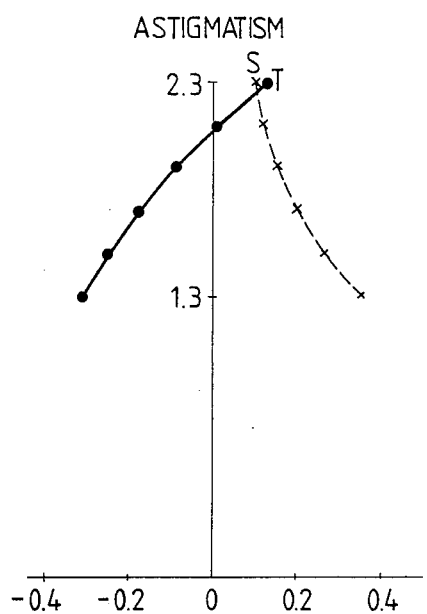
FIGS. 21 and 22 are diagrams showing astigmatism of the first and second comparison examples depicted in FIGS. 10 and 11, respectively.
Figure 22:
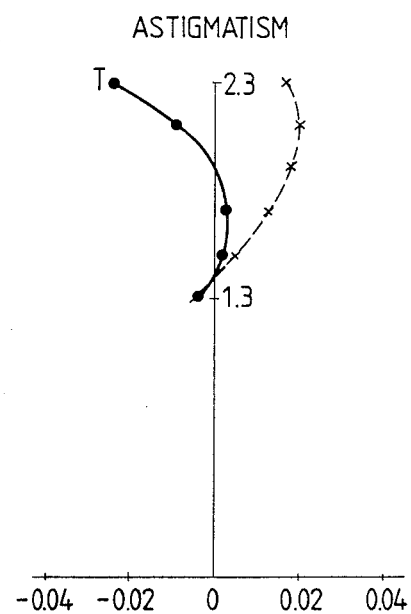
Figure 23:
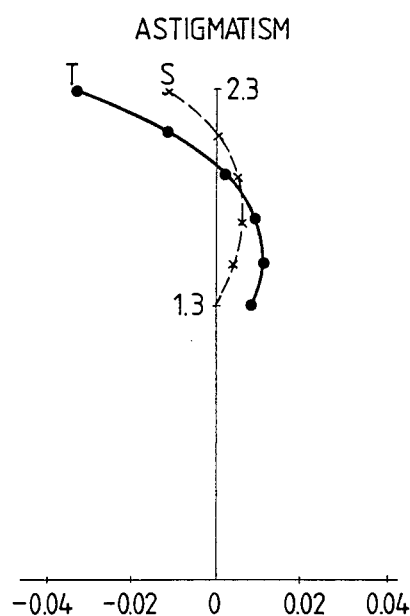
Figure 24:
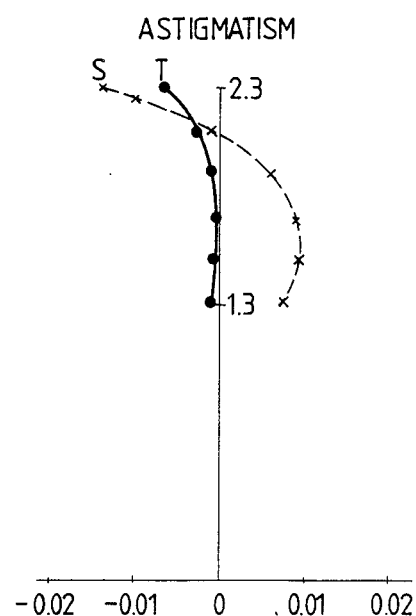

FIGS. 17 to 20 and FIGS. 23 to 27 are characteristic diagrams showing astigmatic differences in the first to fourth embodiments and the fifth to ninth embodiments, respectively, and as will be obvious from contrasts with the characteristic diagrams showing the astigmatic differences in the first and second comparison examples (the configuration examples depicted in FIGS. 10 and 11 in which the aspherical surfaces are not in any way used for the reflecting surface 7' and in the imaging optical system 3) shown in the above figures and FIGS. 21 and 22, according to the present invention, a bright optical system can be provided which is small in astigmatic difference, is favorably corrected in distortion, and has small F-number, with the result that it is possible to cause the distal end portion of the endoscope to be finer.

What is claimed is:

1. An optical system for endoscopes to be used for observing the interior of pipes comprising an imaging optical system and a reflecting mirror arranged in front of said imaging optical system, wherein at least one surface of lens components constituting said imaging optical system is an aspherical surface and at least one reflecting surface of said reflecting mirror is an aspherical surface including an optical axis of said imaging optical system and having a convex configuration toward said imaging optical system.

2. An optical system for endoscopes to be used for observing the interior of pipes comprising an imaging optical system and a reflecting mirror arranged in front of said imaging optical system, wherein a reflecting surface of said reflecting mirror is an aspherical surface which is attained by rotating a curve, around an optical axis, compounded of curves of n order (n=2, 3, 4...) on the basis of a straight line inclined with respect to the optical axis in a plane surface including the optical axis, said aspherical surface having at least one inflection point.

3. An optical system for endoscopes to be used for observing the interior of pipes comprising an imaging optical system and a reflecting mirror arranged in front of said imaging optical system, wherein at least one surface of lens components constituting said imaging optical system and at least one reflecting surface of said reflecting mirror are aspherical, and wherein the reflecting surface of said reflecting mirror is a conical surface and said imaging optical system includes at least one aspherical surface.

4. An optical system for endoscopes to be used for observing the interior of pipes comprising an imaging optical system and a reflecting mirror arranged in front of said imaging optical system, wherein at least one surface of lens components constituting said imaging optical system and at least one reflecting surface of said reflecting mirror are aspherical, wherein a reflecting surface of said reflecting mirror is part of a spherical surface and said imaging optical system includes at least one aspherical surface.

5. An optical system for endoscopes according to any one of claim 3 or 4 wherein the aspherical surface included in said imaging optical system is a positive lens surface having the radius of curvature larger on its periphery than in the vicinity of an optical axis.

6. An optical system for endoscopes according to any one of claim 3 or 4, wherein the aspherical surface included in said imaging optical system is a negative lens surface having the radius of curvature smaller on its periphery than in the vicinity of an optical axis.

7. An optical system for endoscopes to be used for observing the interior of pipes comprising an imaging optical system and a reflecting mirror arranged in front of said imaging optical system, wherein at least one surface of lens components constituting said imaging optical system and at least one reflecting surface of said reflecting mirror are aspherical, and wherein the reflecting surface of said reflecting mirror is an aspherical surface which is attained by rotating a curve, around an optical axis, compounded of curves of n order (n=2, 3, 4, ...) on the basis of a straight line inclined with respect to the optical axis in a plane surface including the optical axis, said aspherical surface having at least one inflection point, and said imaging optical system includes at least one aspherical surface, which is a positive lens surface having the radius of curvature larger on its periphery than in the vicinity of the optical axis.

8. An optical system for endoscopes to be used for observing the interior of pipes comprising an imaging optical system and a reflecting mirror arranged in front of said imaging optical system, wherein at least one surface of lens components constituting said imaging optical system and at least one reflecting surface of said reflecting mirror are aspherical, and wherein the reflecting surface of said reflecting mirror is an aspherical surface which is attained by rotating a curve, around an optical axis, compounded of curves of n order (n=2, 3, 4, ...) on the basis of a straight line inclined with respect to the optical axis in a plane surface including the optical axis, said aspherical surface having at least one inflection point, and said imaging optical system includes at least one aspherical surface, which is a negative lens surface having the radius of curvature smaller on its periphery than in the vicinity of the optical axis.

* * * * *